(12) United States Patent
Dolzinski et al.

(10) Patent No.: US 10,407,150 B2
(45) Date of Patent: Sep. 10, 2019

(54) STRUCTURAL COMPONENT, AIRCRAFT OR SPACECRAFT, AND METHOD

(71) Applicant: AIRBUS OPERATIONS GMBH, Hamburg (DE)

(72) Inventors: Wolf-Dietrich Dolzinski, Ganderkesee (DE); Michael Kolax, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 459 days.

(21) Appl. No.: 13/851,555

(22) Filed: Mar. 27, 2013

(65) Prior Publication Data

US 2013/0266765 A1 Oct. 10, 2013

Related U.S. Application Data

(63) Continuation of application No. PCT/EP2011/067464, filed on Oct. 6, 2011.
(Continued)

(30) Foreign Application Priority Data

Oct. 7, 2010 (DE) .................. 10 2010 042 128

(51) Int. Cl.
*B64C 1/12* (2006.01)
*B29C 70/08* (2006.01)
(Continued)

(52) U.S. Cl.
CPC .............. *B64C 1/12* (2013.01); *B29C 65/483* (2013.01); *B29C 65/564* (2013.01); *B29C 65/62* (2013.01); *B29C 65/72* (2013.01); *B29C 66/1122* (2013.01); *B29C 66/45* (2013.01);

*B29C 66/472* (2013.01); *B29C 66/721* (2013.01); *B29C 66/727* (2013.01); *B29C 66/72141* (2013.01);
(Continued)

(58) Field of Classification Search
CPC ......... B32B 3/10; B32B 3/18; C04B 41/0006; C04B 35/565
USPC ...................... 428/105–119, 158; 156/92, 93
See application file for complete search history.

(56) References Cited

U.S. PATENT DOCUMENTS 4,350,728 A 9/1982 Huang et al.
5,869,165 A 2/1999 Rorabaugh et al.
(Continued)

FOREIGN PATENT DOCUMENTS

DE 10 2005 024 408 11/2006
EP 0 514 616 11/1992
(Continued)

OTHER PUBLICATIONS

International Search Report for Application No. PCT/EP2011/067464 dated Nov. 29, 2011.
(Continued)

*Primary Examiner* — Brian Handville
(74) *Attorney, Agent, or Firm* — Jenkins, Wilson, Taylor & Hunt, P.A.

(57) ABSTRACT

A structural component for an aircraft or spacecraft, comprising: a planar member; a reinforcing member which projects from the planar member and is rigidly connected thereto; the reinforcing member comprising at least a foam layer and a cover layer, a plurality of pins extending at least through the foam layer and the cover layer, and at least the pins and the cover layer comprising a curable matrix.

18 Claims, 4 Drawing Sheets

Related U.S. Application Data

(60) Provisional application No. 61/390,793, filed on Oct. 7, 2010.

(51) Int. Cl.

| | | |
|---|---|---|
| *B29C 70/86* | (2006.01) | |
| *B29D 99/00* | (2010.01) | |
| *B29C 65/62* | (2006.01) | |
| *B32B 7/08* | (2019.01) | |
| *B29C 65/48* | (2006.01) | |
| *B29C 65/56* | (2006.01) | |
| *B29C 65/72* | (2006.01) | |
| *B29C 65/00* | (2006.01) | |
| *B32B 5/06* | (2006.01) | |
| *B32B 5/18* | (2006.01) | |
| *B32B 5/24* | (2006.01) | |
| *B32B 3/06* | (2006.01) | |
| *B32B 3/08* | (2006.01) | |
| *B29C 70/24* | (2006.01) | |
| *B29K 105/04* | (2006.01) | |
| *B29L 31/30* | (2006.01) | |
| *B64C 1/00* | (2006.01) | |

(52) U.S. Cl.
CPC ........... *B29C 70/086* (2013.01); *B29C 70/24* (2013.01); *B29C 70/865* (2013.01); *B29D 99/0017* (2013.01); *B32B 3/06* (2013.01); *B32B 3/08* (2013.01); *B32B 5/06* (2013.01); *B32B 5/18* (2013.01); *B32B 5/245* (2013.01); *B32B 7/08* (2013.01); *B29C 66/5326* (2013.01); *B29C 66/71* (2013.01); *B29C 66/7212* (2013.01); *B29C 66/72525* (2013.01); *B29C 66/7392* (2013.01); *B29C 66/7394* (2013.01); *B29K 2105/04* (2013.01); *B29L 2031/3082* (2013.01); *B32B 2260/021* (2013.01); *B32B 2260/046* (2013.01); *B32B 2307/102* (2013.01); *B32B 2307/304* (2013.01); *B32B 2307/50* (2013.01); *B32B 2605/18* (2013.01); *B64C 2001/0072* (2013.01); *Y02T 50/43* (2013.01); *Y10T 428/24496* (2015.01)

(56) References Cited

U.S. PATENT DOCUMENTS

| | | | |
|---|---|---|---|
| 5,958,550 A | 9/1999 | Childress | |
| 6,436,507 B1 * | 8/2002 | Pannell | 428/102 |
| 7,510,757 B2 * | 3/2009 | Lee et al. | 428/172 |
| 2002/0144767 A1 | 10/2002 | Johnson | |

FOREIGN PATENT DOCUMENTS

| | | |
|---|---|---|
| WO | WO 01/47706 | 7/2000 |
| WO | WO 2006/008166 | 1/2006 |
| WO | WO 2012/045814 | 4/2012 |

OTHER PUBLICATIONS

German Office Action for Application No. 10 2010 042 128.6 dated Nov. 22, 2012.
International Preliminary Examination Report / Written Opinion for Application No. PCT/EP2011/067464 dated Nov. 29, 2011.

* cited by examiner

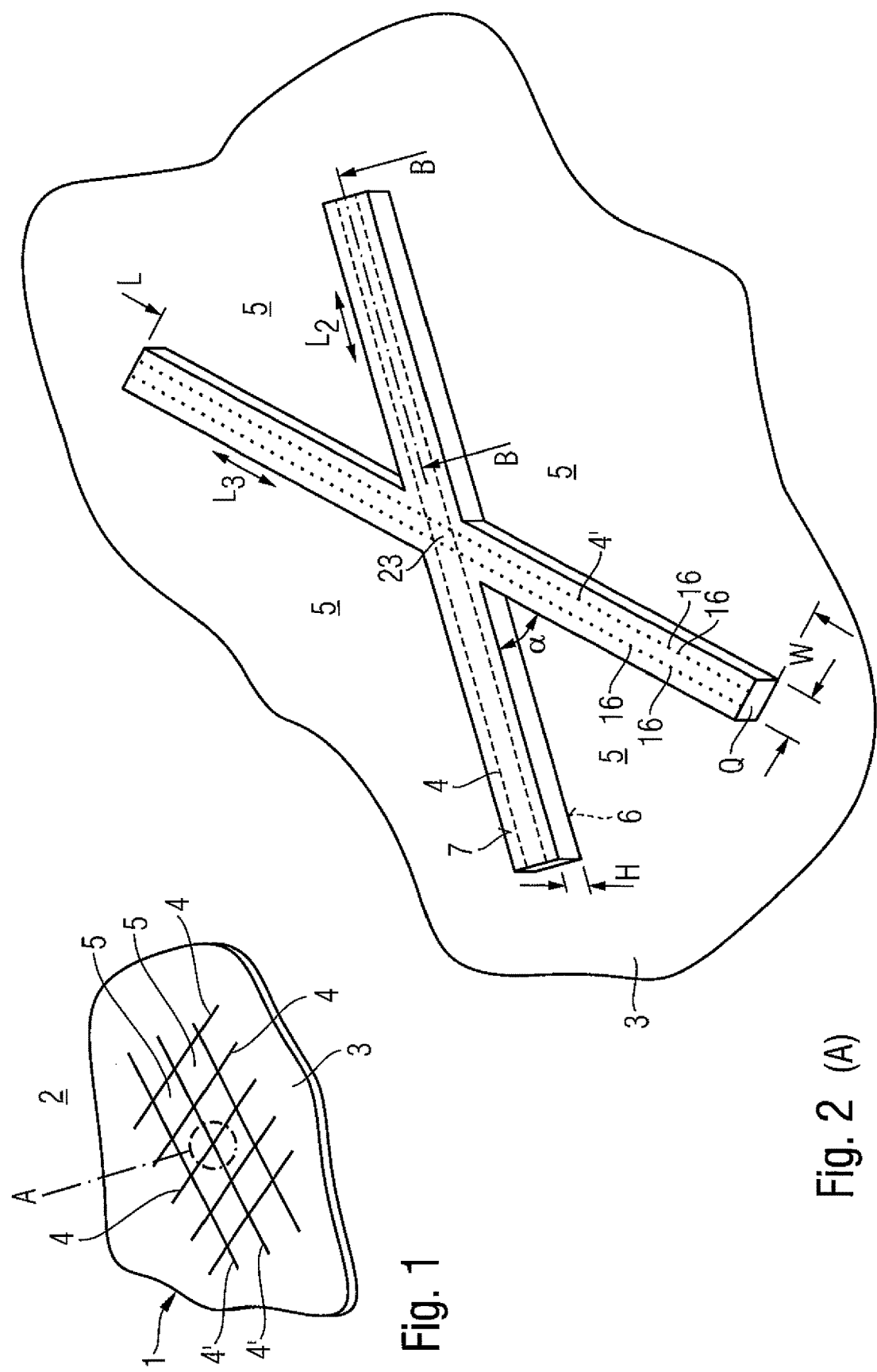

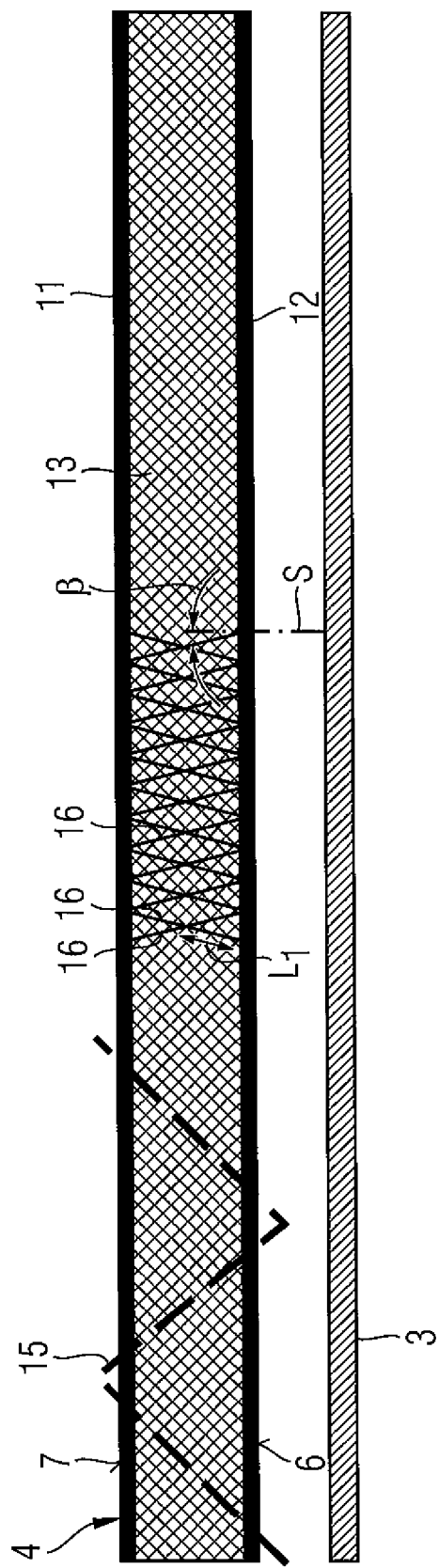
Fig. 3 (B - B)

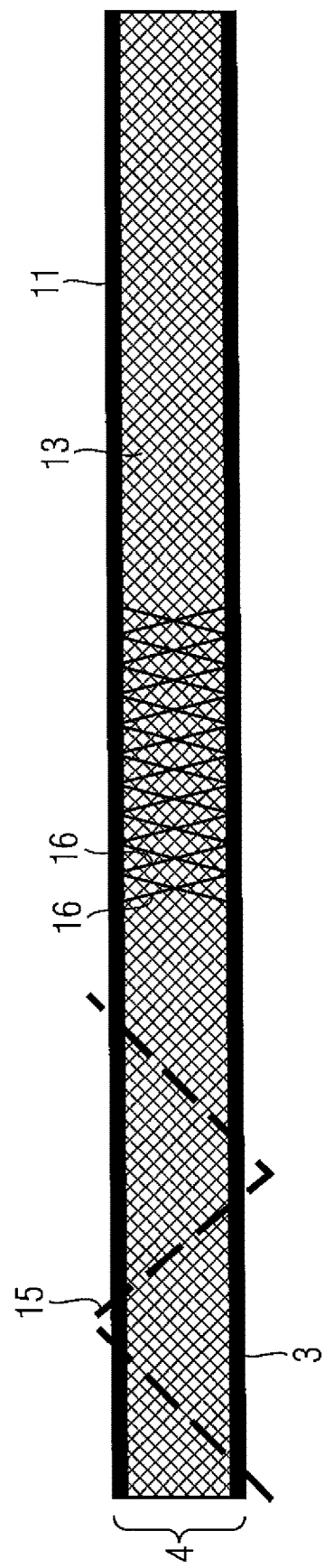
Fig. 4 (B' - B')

STRUCTURAL COMPONENT, AIRCRAFT OR SPACECRAFT, AND METHOD

CROSS REFERENCE TO RELATED APPLICATIONS

This application is a continuation of and claims priority to PCT/EP2011/067464 filed Oct. 6, 2011 which claims the benefit of and priority to U.S. Provisional Application No. 61/390,793, filed Oct. 7, 2010 and German patent application No. 10 2010 042 128.6, filed Oct. 7, 2010, the entire disclosures of which are herein incorporated by reference.

FIELD OF THE INVENTION

The present invention relates to a structural component, an aircraft or spacecraft and a method.

BACKGROUND OF THE INVENTION

Although applicable to any desired structural components and aircraft or spacecraft, the present invention and the set of problems on which it is based are described in greater detail in relation to a fuselage structure of an aircraft.

Carbon-fibre-reinforced plastics material (CFRP) fuselage structures generally consist of planar members, in particular skin members, which are shaped in the manner of a tube. The planar members are reinforced internally in the longitudinal and peripheral direction by reinforcing members, in particular stringers and formers. The reinforcement members provide the required stability and rigidity, taking a considerable proportion of the loads.

Modern CFRP fuselage structures generally reflect the construction of older metal fuselage structures. Because of the very different material properties, this approach leads to high manufacturing costs for CFRP fuselage structures. The high manufacturing costs result in particular from the fact that the methods used to manufacture the metal fuselage structures are not really applicable to a fibre composite material, in particular a thermosetting one Moreover, these "black metal" fuselage structures cannot fully exploit the typical advantages of anisotropic fibre composite materials, since they evolved from isotropic metals. For example, mass-produced parts, such as angle brackets, clips or the like, cannot really be made cost-effectively from fibre composite material.

Further, sandwich constructions are used in the field of aviation, and are formed from an upper and a lower cover layer between which a honeycomb core structure is located to increase the rigidity. As an alternative to the honeycomb core structure, it has also become known to form the core structure from a rigid foamed material. As regards the thermal and acoustic insulation and the component manufacture, inter alia, the use of rigid foamed materials of this type has advantages over the use of honeycomb core structures. The poor mechanical properties by comparison with the honeycomb core structures are a drawback of the rigid foamed material core structures. Stitching processes, in which fibres are introduced into the cover layers and the rigid foamed foam, are used to compensate for these poor mechanical properties. After a resin infiltration process, the fibres which are embedded in the resin contribute to the mechanical reinforcement of the rigid foamed material, the fibres, along with the resin, forming what are known as "pins". A method of this type is disclosed for example in DE 10 2005 024 408 A1.

The use of sandwich constructions, as described above, is already a first step towards producing components which exploit the specific material properties of fibre composite materials. Currently, however, there are still no adequate solutions available which provide a structural component comprising a planar member and comprising a reinforcing member reinforcing said planar member, and which simultaneously exploit the specific material properties of fibre composite materials.

SUMMARY OF THE INVENTION

An aspect of the present invention is therefore to provide a structural component, an aircraft or spacecraft, and a method which meet the aforementioned requirements.

Accordingly, a structural component for an aircraft or spacecraft is provided, comprising: a planar member; a reinforcing member which projects from the planar member and is rigidly connected thereto; the reinforcing member comprising at least a foam layer and a cover layer, a plurality of pins extending at least through the foam layer and the cover layer, and at least the pins and the cover layer comprising a curable matrix.

An aircraft or spacecraft comprising the structural component according to the invention is further provided.

A method, in particular for manufacturing the structural component according to the invention, is further provided, comprising the steps of: applying a cover layer to a foam layer; introducing a plurality of pins into the foam layer and the cover layer; arranging the foam layer, the cover layer and the pins on a planar member so as to form a reinforcing member projecting from the planar member; infiltrating at least the cover layer and the pins with a curable matrix and curing said matrix; and connecting the reinforcing member to the planar member.

The idea behind the present invention is to reinforce a planar member with a reinforcing member comprising a foam layer and pins. The reinforcing member is accordingly no longer formed in the manner conventional for "black metal" constructions, since reinforcing members of "black metal" constructions of this type have for example a T-shaped or Ω-shaped cross-section and are formed entirely of CFRP, whilst the invention provides a solution which takes into account the specific material properties of fibre composite materials. The pins advantageously contribute to the reinforcement of the structural component, in such a way that a highly mechanically efficient structure is achieved.

Advantageous configurations of the invention are provided in the dependent claims.

In the present context, a "pin" means a pin-shaped formation comprising fibres which extend in the longitudinal direction of the pin and are embedded in a matrix, in particular an epoxide and/or thermoplastic matrix. The pins may, as described in the introduction, be produced in the reinforcing member by a stitching process and a subsequent resin infiltration process. Alternatively, however, it is also possible to produce the pins in advance and subsequently to introduce them into the reinforcing member. For example, the pins may be produced in advance and pierced through the cover layer and the foam layer.

In the present context, "curable matrix" is intended also to include a matrix which is already fully cured.

It should be noted that the steps in the method according to the invention can be carried out in any desired order, and this order should not be considered to be predetermined by the use of any of the specific articles. Thus, for example, the step of infiltrating the cover layer and the pins with the curable matrix and curing said matrix may take place before the cover layer and pins are arranged, along with the foam layer, on the planar member.

In one configuration of the structural component according to the invention, the pins also extend through the planar member, at least in part. This provides an even more stable structural component, since the pins are thus also anchored in the planar member.

In a further configuration of the structural component according to the invention, the foam and/or the pins are connected, in particular glued, directly to the planar member. This results in a construction which is easy to manufacture. This is particularly appropriate if the foam layer is produced directly on the planar member, the cover layer is subsequently applied to the side of the foam layer remote from the planar member, and the pins are subsequently produced. In this case, the cover layer is preferably stitched to the planar member, the pins being produced by subsequent resin infiltration.

In a further configuration of the structural component according to the invention, the reinforcing member comprises a further cover layer, which is arranged between the planar member and the foam layer and connected thereto, the cover layer likewise comprising a curable matrix. A construction of this type is particularly appropriate in a solution in which the reinforcing member is initially constructed from the cover layer, the foam layer, the further cover layer and the pins. For example, the cover layer may be stitched to the foam layer and if applicable to the further cover layer to produce the pins, and subsequently undergo resin infiltration. Subsequently, the reinforcing member formed in this manner is applied, in particular glued, directly to the planar member.

In a further configuration of the structural component according to the invention, the pins extend through the further cover layer. Anchoring the pins in the further cover layer results in an even more stable structural component.

In a further configuration of the structural component according to the invention, the cover layer, the further cover layer, the planar member and/or the pins comprise a fibrous material, in particular an interlaid scrim, woven fabrics and/or rovings, which is infiltrated by the respective matrix. An epoxy resin and/or thermoplastic matrix may be considered for the matrix.

In a further configuration of the structural component according to the invention, two of the reinforcing members are provided, and cross at a crossing point, and at the crossing points, fibres which extend in the longitudinal direction of the respective reinforcing members are exclusively those which extend over the entire length of a respective reinforcing member. This prevents the fibres from being doubled up in the region of the crossing points, making it possible to reduce the weight and save material.

In a further configuration of the structural component according to the invention, the planar member is formed as a skin portion and/or a plurality of reinforcing members are provided and together form a grid structure, in particular a diamond structure. With a grid structure of this type, a very stable structural component can be produced. The structural component is preferably formed as a fuselage barrel.

In a further configuration of the method according to the invention, the pins are introduced by inserting prefabricated rigid pins, by stitching in fibres and/or incorporating fibres at least into the foam layer and the cover layer. With the aforementioned configuration, the pins can be produced in a simple manner.

In a further configuration of the method according to the invention, a further cover layer is provided between the foam layer and the planar member and connected thereto. The further cover layer increases the stability of the structural component.

In a further configuration of the method according to the invention, the pins are initially inserted into the foam layer and the cover layer and if applicable into the further cover layer, subsequently the foam layer or if applicable the further cover layer is connected to the planar member or the foam layer and the cover layer and if applicable the further cover layer are arranged on the planar member, and subsequently the pins are introduced into the foam layer, the cover layer, the planar member, and if applicable the further cover layer. This provides various efficient ways of producing the planar member comprising the reinforcing member.

In a further configuration of the method according to the invention, the cover layer and if applicable the further cover layer are formed from a fibrous material, in particular a fibrous interlaid scrim, fibres of the fibrous material in particular extending exclusively in a respective longitudinal direction of two reinforcing members which are to be manufactured and parallel to this direction, triangular, diamond or rectangular regions being cut out of the fibrous material, longitudinal edges of the regions extending parallel to the respective longitudinal directions of the reinforcing members which are to be manufactured. This makes it possible to prevent fibres from being doubled up at crossing points of the reinforcing members in a simple manner, as described previously above.

In a further configuration of the method according to the invention, the cover layer, the pins and if applicable the further cover layer are infiltrated with the matrix and/or cured at a first time, and the planar member is infiltrated with the matrix and cured at a second time, the first and second times being the same or different times. In other words, it is thus possible initially to cure the reinforcing member in advance and subsequently to apply it to the planar member, which has already been cured. Alternatively, the planar member and the reinforcing member can be cured simultaneously. For this purpose, the planar member and the reinforcing member are joined together while each uncured or only partially cured, and be cured together. As a further alternative, the at least incompletely cured reinforcing member can be applied to the cured planar member.

BRIEF DESCRIPTION OF THE DRAWINGS

The invention is described in greater detail in the following by way of embodiments, with reference to the appended drawings, in which:

FIG. 1 is a perspective view of a detail of a structural component according to an embodiment of the present invention;

FIG. 2 is an enlarged view A from FIG. 1;

FIG. 3 is a section B-B from FIG. 2 in one state of a method according to an embodiment of the present invention;

FIG. 4 is the section B-B of FIG. 3 in accordance with a variant B'-B' of the method.

DETAILED DESCRIPTION OF THE INVENTION

Figure 5:
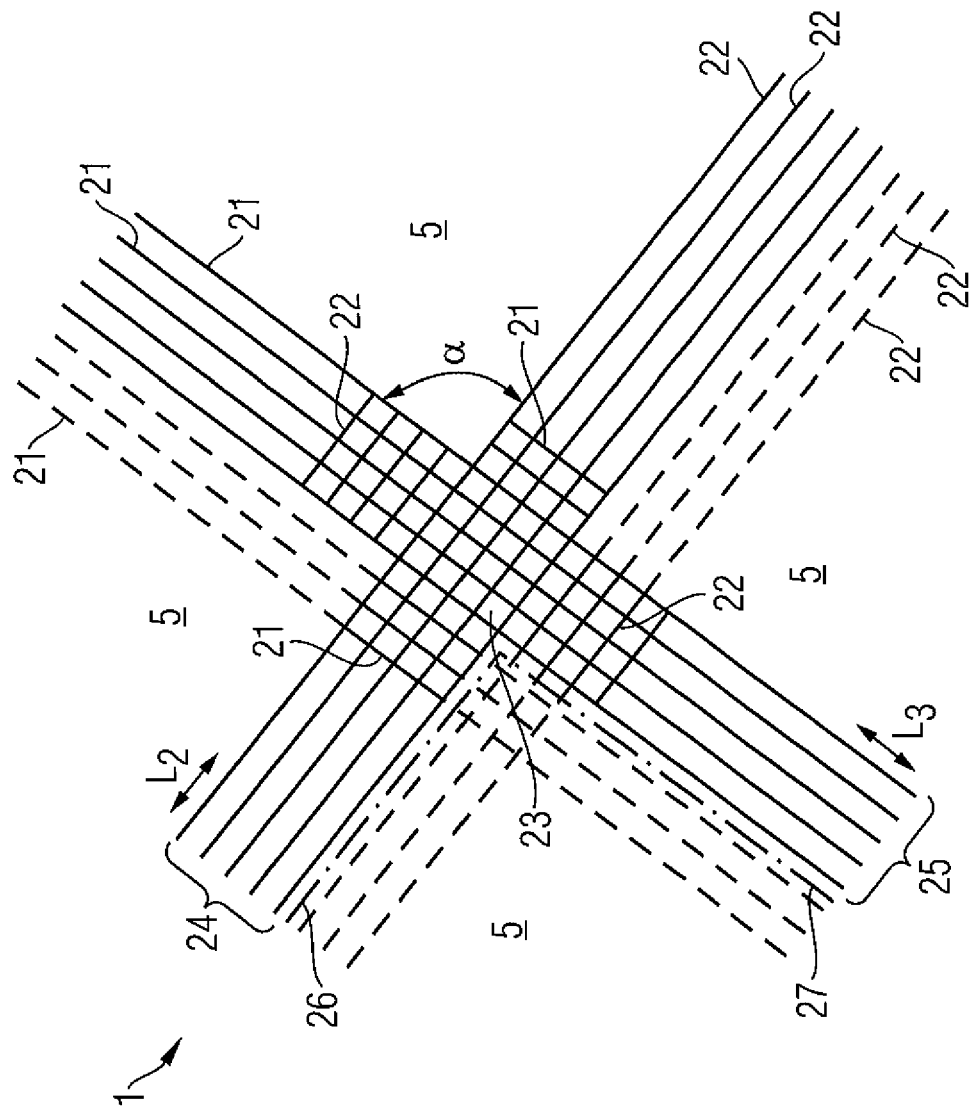
FIG. 5 is a plan view of a fibrous material for manufacturing reinforcing members of the structural component of FIG. 1.

In the figures, like reference numerals denote like or functionally equivalent components unless otherwise stated.

FIG. 1 is a perspective view of a detail of a structural component 1 of an aircraft generally denoted as 2.

The structural component 1 comprises a planar member 3 and reinforcing members 4, 4'. The reinforcing members 4, 4' are firmly attached to the planar member 3. The reinforcing members 4, 4' form a diamond structure having an angle α—see FIG. 2—of between for example 15 and 45°, preferably between 30 and 40°. The angle α is the acute angle of a respective diamond 5.

FIG. 2 is an enlarged view A from FIG. 1.

The reinforcing members 4, 4' project from the planar member 3. In other words, an underside 6, concealed in FIG. 2, of each of the reinforcing members 4, 4' lies on the planar member 3, and an upper side 7 thereof is spaced apart from the underside 6 or upper side of the planar member 3 by a height H. The height H may for example be between 25 and 35 mm. Further, the reinforcing members 4, 4' may have a width W of for example 35 to 70 mm. The height H and the width W relate in the above to a cross-section Q of a respective reinforcing member 4, 4'. In the present embodiment, the cross-section Q is rectangular in shape. However, other cross-sections are equally conceivable. The length L of a respective reinforcing member 4, 4' can be anything from a few centimeters to several meters.

FIG. 3 is a section B-B from FIG. 2 in one state of a method according to an embodiment of the present invention.

It can be seen from FIG. 3 that the reinforcing member 4 is composed of an upper cover layer 11, a lower cover layer 12, and a foam layer 13 arranged between the cover layers 11, 12. The cover layers 11, 12 each comprise a fibrous material 14, described in greater detail below with reference to FIG. 5, which is embedded in an epoxy resin matrix. The foam layer 13 may in particular be a rigid foam.

In the method steps preceding the state shown in FIG. 3, the cover layers 11, 12 are stitched to the foam layer 13 positioned between them by way of a stitching thread 15, as is shown highly schematically on the left-hand side of FIG. 3 by way of a dashed line. The stitching thread 15 is for example formed as roving, and therefore comprises a plurality of individual threads. The reinforcing member 4 formed in this manner is infiltrated with an epoxy resin matrix, the fibrous material 14 of the cover layers 11, 12 being infiltrated as well as the stitching thread 15. Subsequently, the reinforcing member formed in this manner is cured, forming stable pins 16. The pins 16 are of an elongate shape and may in particular be formed with a circular cross-section. The fibres in the respective pins 16 extend along the longitudinal direction $L_1$ thereof. The longitudinal direction $L_1$ of the respective pins 16 is preferably oblique to a normal S to the planar member 3, for example at an angle β of between 10 and 80°. The stitching preferably takes place in the longitudinal direction of a respective reinforcing member 4, 4', and this results in two parallel rows of pins 16, as can be seen particularly clearly from FIG. 2.

Subsequently, the formed reinforcing member 3 is cured. To provide the reinforcing member 4 with a corresponding shape, it can be oriented on a correspondingly contoured laminated device before being cured. In this way, a curved shape of the reinforcing member 4 can for example be achieved.

After the reinforcing member 4 is cured, it is applied to the planar member 3. The planar member 3, which is in particular a fuselage outer skin, preferably likewise comprises a fibrous material which is embedded in an epoxy resin material. The planar member 3 is thus formed for example as a prepreg. After the reinforcing member 4 is applied to the planar member 3, the planar member 3 is cured, whereupon the epoxy resin matrix in the planar member 3 connects it firmly to the reinforcing member 4.

However, a number of variants are possible in this context. For example, the cover layers 11, 12 may comprise a prepreg. Accordingly, the pins 16 may also be formed with an epoxy resin matrix which has not yet been cured. The reinforcing member 4 which has not yet been cured may thus be applied to the planar member 3 while still flexible. In a subsequent step, the structural component 1 formed in this manner is cured as a whole. As a further alternative, the reinforcing member 4, which is provided with the matrix but has not yet been cured, could be placed on the planar member 3 which has already been cured, whereupon the structural component 1 formed in this manner is cured as a whole.

FIG. 4 shows the section B-B of FIG. 3 in accordance with a variant B'-B' of the method.

In this variant, the reinforcing member 4 is constructed on the planar member 3. For this purpose, the foam layer 13 is applied directly to the planar member 3. However, it would equally be possible also to apply the lower cover layer 12 to the planar member 3 beforehand, and only subsequently to apply the foam layer 13 to the lower cover layer 12. Subsequently, the upper cover layer 11 is applied to the foam layer 13. Subsequently, the upper cover layer 11, the foam layer 13 and the planar member 3 are stitched together by means of the stitching thread 15. After a corresponding infiltration with an epoxy resin matrix, the pins 16 are formed. The configurations and variants which were described previously in connection with FIG. 3 can be applied correspondingly to the embodiment of FIG. 4.

Instead of the stitching process, it is further conceivable to use a different type of process, in which the pins 16 are prefabricated so as already to be stable, and are subsequently inserted into the composite consisting of the upper cover layer 11, the foam layer 13 and the planar member 3. The prefabricated pins 16 are thus already cured. After the pins 16 are inserted, the epoxy resin matrix of the upper cover layer 11 of the planar member 3 and if applicable the lower cover layer 12 are subsequently cured.

The pins 16 may moreover be formed by incorporating the fibrous material 15 into at least the foam layer 13 and the upper cover layer 11 by means of a needle, as disclosed in DE 10 2005 024 408 A1, of which the content to this effect is also the subject-matter of the present application.

In the embodiments of FIGS. 4 and 5, the pins 16 may each extend through the upper cover layer 11, the lower cover layer 12 and the planar member 3, as is shown for two pins 16 in FIG. 4.

FIG. 5 is a plan view of the fibrous material 14 for forming the grid-like reinforcing members 4, 4'.

The fibrous material 14 is composed of fibres 21, 22. The fibres 21 and 22 extend at the angle α to one another—see FIGS. 2 and 5. The fibres 21 and 22 may be interwoven. Alternatively, the fibres 21 and 22 may be part of different interlaid scrims which are positioned one above the other. The fibres 21 and 22 initially form a planar formation, for example an approximately rectangular formation. FIG. 5 only shows parts of this formation.

Subsequently, the diamond-shaped regions 5 are cut out from the formation—see FIGS. 2 and 5. For this purpose, the fibres 21 and 22, shown in dashed lines in FIG. 5, are cut to length, in such a way that merely the fibres 21 and 22 shown as a solid line in FIG. 5 remain. In FIGS. 2 and 5, the longitudinal direction of the reinforcing member 4 is denoted by the reference numeral $L_2$ and the longitudinal direction of the reinforcing member 4' is denoted by the reference numeral $L_3$. The cutting lines 26 and 27 parallel to the longitudinal directions $L_2$ and $L_3$, for cutting out a respective diamond-shaped region 5, are shown as a dot-dash line in FIG. 5 for merely one of the regions 5.

In a plan view, the fibrous material 14 produced in this manner corresponds to the progression of the reinforcing member 4, 4'—see FIG. 2. The fibrous material 14 is distinguished in that there are no fibres doubled up at the crossing points 23—see FIGS. 2 and 5—between the fibres 24, associated with the reinforcing member 4 and extending in the longitudinal direction $L_2$ thereof, and the fibres 25, associated with the reinforcing member 4' and extending in the longitudinal direction $L_3$ thereof.

The fibrous material 14 may subsequently be used to form the upper cover layer 11 and if applicable the lower cover layer 12. The fibre formation 14 is infiltrated with an epoxy resin matrix and subsequently used as described in connection with FIGS. 3 and 4.

The presently used fibres are preferably carbon fibres, although inclusions of other fibres such as aramid fibres are also conceivable. Whenever reference is made to an epoxy resin matrix in the present document, this may also comprise a proportion of thermoplastic.

Although the invention has been disclosed by way of preferred embodiments, it is not limited thereto, but can be modified in various ways. The embodiments and developments disclosed for the structural component according to the invention apply correspondingly to the aircraft or spacecraft according to the invention and to the method according to the invention, and vice versa. It should further be noted that in the present document, the term "a" does not exclude a plurality.

The invention claimed is:

1. A structural component for an aircraft or spacecraft, comprising:
    a planar member; and
    a reinforcing member which projects from the planar member and is rigidly connected thereto;
    wherein the reinforcing member comprises at least a foam layer and a cover layer, wherein a plurality of pins individually extend continuously through the planar member, the foam layer, and the cover layer, and wherein at least the pins and the cover layer comprise a curable matrix.

2. The structural component of claim 1, wherein the foam layer or the pins or the foam layer and the pins are connected directly to the planar member.

3. The structural component of claim 2, wherein the foam layer or the pins or the foam layer and the pins are glued directly to the planar member.

4. The structural component of claim 1, wherein the reinforcing member comprises a further cover layer, which is arranged between the planar member and the foam layer and connected thereto, the further cover layer likewise comprising a curable matrix.

5. The structural component of claim 4, wherein the pins extend through the further cover layer.

6. The structural component of claim 4, wherein at least one of the cover layer, the further cover layer, the planar member or the pins comprise a fibrous material, which is infiltrated by the respective matrix.

7. The structural component of claim 6, wherein the fibrous material comprises at least one of an interlaid scrim, woven fabrics or rovings.

8. The structural component of claim 6, wherein two of the reinforcing members are provided, and cross at a crossing point, and at the crossing points, fibres of the fibrous material which extend in the longitudinal direction of the respective reinforcing members are exclusively those which extend over the entire length of a respective reinforcing member.

9. The structural component of claim 1, wherein the planar member is formed as a skin portion.

10. The structural component of claim 1, wherein a plurality of the reinforcing members are provided and together form a grid structure.

11. The structural component of claim 10, wherein a plurality of the reinforcing members together form a diamond structure.

12. An aircraft or spacecraft comprising a structural component of claim 1.

13. A method for manufacturing a structural component, comprising:
    providing a planar member;
    providing a reinforcing member which projects from the planar member and is rigidly connected thereto, wherein the reinforcing member comprises at least a cover layer and a foam layer;
    introducing a plurality of pins, wherein the plurality of pins individually extend continuously through the planar member, the foam layer, and the cover layer;
    arranging the foam layer, the cover layer and the pins on the planar member so as to form the reinforcing member projecting from the planar member;
    infiltrating at least the cover layer and the pins with a curable matrix and curing the matrix; and
    connecting the reinforcing member to the planar member.

14. The method of claim 13, wherein the pins are introduced by at least one of inserting prefabricated rigid pins, stitching in fibres or incorporating fibres at least into the foam layer and the cover layer.

15. The method of claim 13, wherein a further cover layer is provided between the foam layer and the planar member and connected thereto.

16. The method of claim 13, wherein the pins are initially inserted at least into the foam layer and the cover layer and if applicable into the further cover layer, subsequently the foam layer or if applicable the further cover layer is connected to the planar member or the foam layer and the cover layer and if applicable the further cover layer are arranged on the planar member, and subsequently the pins are introduced into the foam layer, the cover layer, the planar member and if applicable the further cover layer.

17. The method of claim 13, wherein the cover layer and if applicable the further cover layer are formed from a fibrous material, in particular a fibrous interlaid scrim or fibrous woven fabrics, fibres of the fibrous material in particular extending exclusively in a respective longitudinal direction of two reinforcing members which are to be manufactured and parallel to this direction, triangular, diamond or rectangular regions being cut out of the fibrous material, longitudinal edges of the regions extending parallel to the respective longitudinal directions of the reinforcing members.

18. The method of claim 13, wherein the cover layer, the pins and if applicable the further cover layer are infiltrated with the curable matrix and cured at a first time, and the planar member is infiltrated with a curable matrix and cured at a second time, the first and second times being the same or different times.

* * * * *